United States Patent Office 2,837,420
Patented June 3, 1958

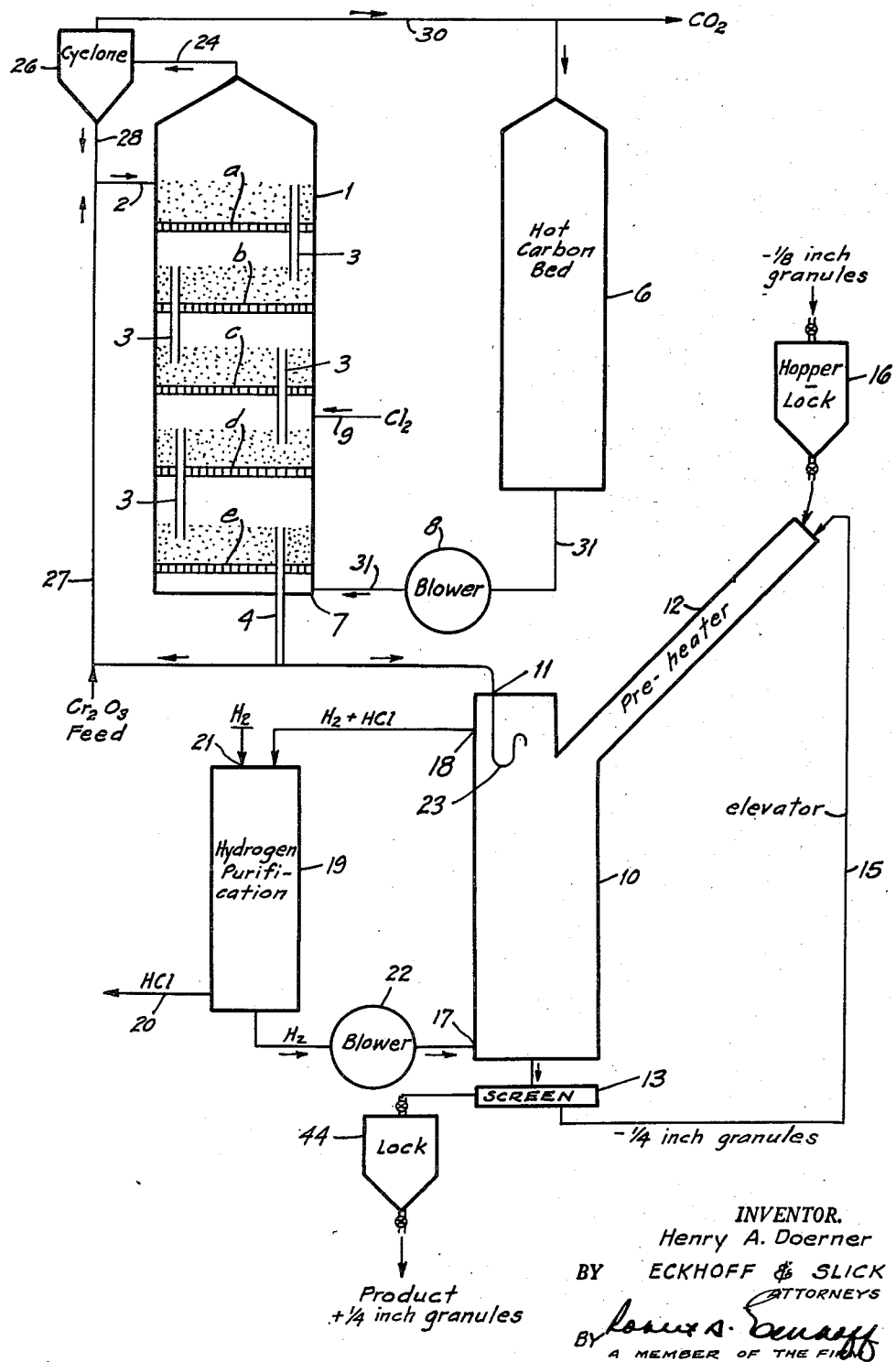
INVENTOR.
Henry A. Doerner
BY ECKHOFF & SLICK
ATTORNEYS

2,837,420
METHOD OF PRODUCING CHROMIUM

Henry Alfred Doerner, San Francisco, Calif.; Blanche S. Doerner, sole legatee of said Henry Alfred Doerner, deceased Application July 30, 1953, Serial No. 371,240

9 Claims. (Cl. 75—84.5)

This invention relates to a process for producing chromium metal of high purity by converting chromic oxide to anhydrous chromous chloride and reducing this chloride with hydrogen to produce metallic chromium.

It is in general the broad object of the present invention to provide an improved and novel process for the production of chromium metal from a chromium material such as chromic oxide or any suitable source of such oxide.

Another object of the present invention is to provide a process for the manufacture of chromous chloride from chromium oxide.

A further object of the present invention is to provide a process for reducing chromous chloride to chromium metal.

The invention includes other objects and features of advantage, some of which, together with the foregoing, will appear hereinafter wherein the preferred process and the manner of practicing the same are set forth.

Chromic oxide, either alone or combined as in the mineral chromite, is readily converted to a chloride by a high temperature treatment with chlorine and a reducing agent. The latter may be carbon or sulfur provided as such or in a combined form as in carbon tetrachloride or sulfur dichloride; carbon monoxide can also be used. When chromite ore is chlorinated at 900° to 1000° C., all of the iron, aluminum and chromium oxides can be converted to vaporized chlorides and chromic chloride can be recovered by selective condensation. Magnesium chloride is formed also but is only partly vaporized. The unvaporized residue will contain silica, refractory silicates and fused magnesium chloride which may cement the residue on cooling and cause mechanical problems in a continuous process. The residue will also contain part of the chromium as a relatively non-volatile chromous chloride unless chlorine has been supplied in sufficient amount to form the higher chlorides of each reacting metal plus a 5 to 10 percent excess.

Although the chlorination reactions involved in the above are exothermic, they do not provide enough heat to maintain the reaction temperature and to vaporize the chlorides formed in the reaction. Unless heat is supplied from an external source to maintain the reaction temperature at or above 900° C., unvaporized chromium chlorides will accumulate in the reaction zone. Since chlorine and chloride vapors are present in the reaction chamber, heat input through the wall defining the reaction zone has not proven feasible and other heat input means have been proposed to maintain a temperature at which chromic chloride is completely vaporized.

One prior investigator (Maire, Patent 2,133,798) has suggested a process in which a pulverized mixture of chromite and carbon is transported through a reaction zone "as a thin film coating" on a relatively large mass of preheated "carrier particles," to supply heat to the reaction zone and to provide adequate contact between the solid and gaseous reactants. This process is technically feasible, but it suffers from serious economic limitations that have so far prevented its commercial utilization. For example, and by way of illustration, the consumption of chlorine by the various constituents of one short ton of concentrate derived from a typical low grade domestic chromite ore, is as follows:

Cr 27.3% 546 lbs.+1125 lbs. $Cl_2$=1671 lbs. $CrCl_3$
Fe 18.4% 368 lbs.+700 lbs. $Cl_2$=1068 lbs. $FeCl_3$
Al 7.7% 154 lbs.+610 lbs. $Cl_2$=764 lbs. $AlCl_3$
Mg 7.8% 156 lbs.+450 lbs. $Cl_2$=611 lbs. $MgCl_2$ Excess required 160 pounds.
Total chlorine 3045 lbs. per ton of chromite.

Unless a profitable use or market can be found for the impure chlorides of iron, aluminum and magnesium, the chlorine content of the by-products must be regenerated for repeated use by difficult and expensive operations.

The chromic chloride vapor condenses as a crystalline deposit at temperatures between 900° and 400° C.; this deposit will also contain $MgCl_2$ and $FeCl_3$ and additional purification is required to obtain satisfactory material for production of pure chromium metal. In addition, any contact with air results in absorption of moisture and air. When the chloride is thereafter reduced with hydrogen to chromium the oxygen content of adsorbed moisture and air remains in the metal product as an undesirable impurity which, even though present only in trace, has serious adverse and deleterious effects on the properties of the chromium.

In accordance with this invention, I provide a process for converting chromic oxide to chromous chloride which is thereafter reduced to metallic chromium. The chromous chloride formation and its reduction are coordinated in operation, the chloride being passed immediately to the hydrogen reduction through a seal of liquid chromous chloride which serves to separate the two operations and yet which permits the two operations to be coordinated and to go on simultaneously.

THE FORMATION OF CHROMOUS CHLORIDE

The chromous chloride is produced by a new chlorination process which can be carried out exothermally at relatively low temperature. Briefly, chromic oxide is first prepared from a low grade chromite ore and then chlorinated under suitable conditions to produce the relatively non-volatile chromous chloride. Only 750 pounds chlorine are required to react with the 546 pounds of chromium derived from a ton of chromite or less than a fourth of the chlorine required when the ore as such is completely chlorinated.

Chromous chloride cannot be produced by direct chlorination of chromic oxide with satisfactory conversions. A discussion of the following chemical reactions will explain the difficulties and how they can be overcome.

CHLORINATION REACTIONS (1)    $Cr_2O_3 + 3C + 2Cl_2 = 2CrCl_2 + 3CO$ (2)    $Cr_2O_3 + 3CO + 2Cl_2 = 2CrCl_2 + 3CO_2$ (3)    $2Cr_2O_3 + 3C + 4Cl_2 = 4CrCl_2 + 3CO_2$ (4)         $2CrCl_2 + Cl_2 = 2CrCl_3$ (5)         $2CrCl_3 + Cl_2 = 2CrCl_4$ (6)    $Cr_2O_3 + 3CO + 3Cl_2 = 2CrCl_3 + 3CO_2$

Reaction 1 takes place when an excess of chromic oxide is heated with carbon and chlorine. Carbon monoxide produced by reaction 1 will serve as the reducing agent in reaction 2. If reactions 1 and 2 occur equally, the result is reaction 3 (i. e., 1+2).

When chromic oxide is heated with a reducing agent and an excess of chlorine, the chromous chloride produced by reactions such as 1, 2 and 3 is instantly converted to chromic chloride by reaction 4, and part of the latter is converted to chromium tetrachloride by reaction 5. Chromium tetrachloride is stable only as a gas at high temperatures, and its only effect on the system is to increase the "apparent" vapor pressure of the trichloride (i. e., chromic chloride, $CrCl_3$). Thus, when chromic oxide is heated with carbon monoxide and an excess of chlorine, the final result is shown by reaction 6 which is, in effect, the sum of reactions 2 and 4.

Reactions 4 and 5 are reversible and their direction depends upon temperature and the concentration of free chlorine. For example, reaction 4 is reversed when chromic chloride is heated in an inert atmosphere; the free chlorine then reacts to form chromium tetrachloride by reaction 5 and the equilibria are established between the solid $CrCl_3$, solid or liquid $CrCl_2$, gaseous $CrCl_2$, $CrCl_3$, $CrCl_4$, and chlorine.

When reaction 4 reaches equilibrium at 700°, 800°, 900° and 1,000° C., the concentrations of chlorine are 0.00000236, 0.00008, 0.0029 and 0.0434 atmosphere, respectively. Since reactions 1, 2 and 3 take place even when the concentration of chlorine is less than the equilibrium values listed above, direct chlorination of $Cr_2O_3$ to $CrCl_2$ is possible in the temperature range of 700° to 800° C.

A batch of chromic oxide can be about half converted to chromous chloride in an hour or less by passing a mixture of carbon monoxide and chlorine through the oxide powder at a temperature of 780° C. At some point before the conversion is complete, reaction 2 will not consume all the chlorine even at a very low rate of flow, and the surplus chlorine then converts $CrCl_2$ to $CrCl_3$. I have determined by numerous tests that complete conversion of chromic oxide to $CrCl_2$ is not feasible in a batch operation.

Chromous chloride fuses at 815° C. and some mixtures of chromous and chromic chloride melt as low as 800° C. The more favorable reaction rates and equilibria at higher temperatures are not effective when the chromic oxide becomes coated with the fused chlorides.

However, the reversal of reaction 4 provides a mechanism by which the $CrCl_3$, unavoidably formed when $Cr_2O_3$ is completely chlorinated, may be reconverted to $CrCl_2$, and the chlorine thus liberated can be used to complete the chlorination of $Cr_2O_3$. Although this mechanism can best be applied in a continuous counter current process, it can be demonstrated by the following batch operations.

Test 1

A bed of chromic oxide (100 grams) was placed on top of a bed of chromic chloride (50 grams) in a vertical two-inch fused silica glass tube heated to 765° C. The charge was supported in the heated zone by a constriction in the tube, and an upward flow of CO was supplied at a rate of 0.68 cubic foot per hour for three hours. The lower portions of both beds were converted to $CrCl_2$. This experiment demonstrated that chlorine, liberated by the dissociation of $CrCl_3$ to $CrCl_2$, is carried by the current of CO to the bed of $Cr_2O_3$ where it reacts to form $CrCl_2$. Since there was no evidence of any reaction except in the lower section of each bed, the reaction rates must be rapid and limited chiefly by the equilibrium concentration of chlorine.

Test 2

All the conditions of Test 1 were applied to an intimate mixture of $CrCl_3$ and $Cr_2O_3$. In this test, the $CrCl_3$ was completely converted to $CrCl_2$ and the liberated chlorine reacted with $Cr_2O_3$ to form additional $CrCl_2$. Since the chlorine is consumed rapidly by reaction 2 when the $Cr_2O_3$ is in intimate contact with the $CrCl_3$, the dissociation of the chloride was not limited by an equilibrium concentration of chlorine and both reactions were completed within a three-hour interval.

I have found that the production of chromous chloride can be achieved most effectively by reactions 2 and 4 followed by a reversal of reaction 4 in a continuous counter-current process. Reactions 2 and 4 are exothermic at temperatures below 800° C. where the vapor pressure of $CrCl_2$ is less than 0.0005 atmosphere and that of $CrCl_3$ is less than 0.04 atmosphere. In a large, well insulated reactor an optimum temperature can be maintained easily by the exothermic heats of reaction inherent in reactions 2 and 4.

HEARTH FURNACE UTILIZATION

These chlorinating reactions can be carried out effectively in a multiple hearth reactor wherein the finely divided solids are agitated and maintained in a mobile or fluidized condition by an upward flow of a gaseous medium. Chromic oxide, fed continuously into the top hearth, strips chlorine and chloride vapor from the upward flow of gas; about a third of the oxide is converted to $CrCl_2$ and the fluidized mixture flows by gravity into a central zone comprising several hearths where most of the remaining oxide is converted to a mixture of $CrCl_2$ and $CrCl_3$ by a small excess of CO and chlorine.

Part of the $CrCl_3$ produced in the central zone will vaporize and pass into the upper zone where it dissociates to $CrCl_2$ and liberates chlorine that reacts with chromic oxide. The remaining fluidized mixture of $CrCl_2$, $CrCl_3$ and residual $Cr_2O_3$ flows to the bottom hearth where it is treated with CO, in the absence of chlorine, to convert most of the $CrCl_3$ and all of the $Cr_2O_3$ to $CrCl_2$.

Carbon monoxide is admitted below the bottom hearth and chlorine enters above that hearth. The input of each gas is regulated to provide a small excess over that required by reaction 2 for the rate at which $Cr_2O_3$ is fed to the top hearth. The excess chlorine is converted to $CrCl_3$ and discharged from the bottom hearth with the $CrCl_2$ product. The excess CO is removed with $CO_2$ in the exit-gas from the top hearth. Approximately half of the exit-gas is passed through a heated bed of carbon to regenerate all the CO required for the reactions.

To avoid fusing the $CrCl_2$, the temperature must not exceed 800° C. at any point in the reactor; temperatures above 700° C. are required for satisfactory reaction rates. Temperature control is accomplished by preheating or precooling the reactants, or by recirculating the solid or gaseous products. The need for these measures depends upon the size and shape of the reactor and the amount of thermal insulation. Although I have mentioned the reaction as being carried out in a fluidized solids reactor; the process is not limited to such a reactor since it can be carried on in a shaft furnace as well.

CHROMIC OXIDE POROSITY

Chromous chloride occupies approximately three times as much space as the chromic oxide from which it is derived; while chromic chloride occupies about four times as much space as the oxide. Therefore, unless a granule or briquette of chromic oxide has a sufficient porosity, the chlorination reactions will form a coating of chloride that retards and may even prevent complete chlorination until the coating is removed, either mechanically or by vaporization. I have found that the granules or briquettes of chromic oxide should have a porosity or free volume of at least 75%; this porosity is measured by comparing the apparent density with the true density of the solid material.

Like most fine powder, a chemical grade of finely divided $Cr_2O_3$ tends to agglomerate into lumps or pellets which become coated with chloride in a reactor. Even if the pellets have 80% porosity, the reaction rate is greatly retarded when the outer surface is coated with chloride. This condition is prevented or at least greatly improved by dispersing the chromic oxide on the surface of a recirculated portion of small aggregates of crystalline chromous chloride discharged from the reactor.

The chromic oxide used in this chlorination step should be a fine powder having a bulk density of 1.0 or less and containing no impurities that do not vaporize during the chlorination treatment. Such a material can be prepared by several well-known methods that are not a part of the present invention.

THE REDUCTION OF CHROMOUS CHLORIDE TO FORM CHROMIUM METAL

Chromic chloride is easily converted to $CrCl_2$ by high temperature reduction with hydrogen, as indicated by reaction 7. Complete reduction to chromium metal is possible by reaction 8, but this reaction is reversible and its efficiency is limited by the low equilibrium concentration of HCl.

(7)     $2CrCl_3 + H_2 = 2CrCl_2 + 2HCl$ (8)     $CrCl_2 + H_2 = Cr + 2HCl$

These concentrations and the vapor pressure of $CrCl_2$ at selected temperatures are listed below:

PERCENT CONCENTRATION

| Temp., °C. | $CrCl_2$ | HCl | Percent $H_2$ reacted |
|---|---|---|---|
| 600 | .00008 | 0.27 | 0.14 |
| 700 | .00294 | 1.05 | 0.53 |
| 800 | .0527 | 3.11 | 1.58 |
| 900 | .445 | 6.64 | 3.43 |
| 1,000 | 2.445 | 11.90 | 6.34 |

Since on volume of $H_2$ yields two of HCl the equilibrium concentration of 3.11% HCl at 800° C. (assuming 1 atmosphere total pressure) represents only 1.58% utilization of the hydrogen. Reaction rates and utilization are both favored by increasing temperature.

THE MAIER REDUCTION PROCESS

In U. S. Patent 2,142,694, Maier describes a method for reducing chromium trichloride. He points out that reduction to chromous chloride occurs first and that reduction of the latter to chromium metal requires a large excess of hydrogen. Maier also states, "At 815° C. pure $CrCl_2$ melts and in the process of melting easy access of hydrogen is hindered so that reduction is slow at temperatures in the liquid range; 815° C. at one atmosphere therefore provides a limiting temperature . . . above 850° C. the material vaporizes faster than it reduces and difficulties due to vaporization are encountered."

For these reasons, Maier advocates that reduction be carried out at 775° C. to 802° C. and he described technically feasible equipment and techniques for that purpose. Since Maier's process is far in advance of anything that has been published even at this writing, a summary of it will provide a basis for explaining the present invention and its merits.

Maier starts with $CrCl_3$ which has been purified by resublimation and then heated to 200° or 300° C. in a vacuum to remove moisture absorbed by contact with moist air. The $CrCl_3$ is then transferred quickly to a shallow pan and placed in a lock chamber attached to the reduction furnace. The latter is an electrically heated kiln through which the trays loaded with $CrCl_3$ are passed counter-current to a flow of high purity hydrogen gas. Reduction to "sponge" metal is achieved during several hours in which a tray is moved step-wise through the kiln and the product is removed through another lock chamber. The gas locks are purged by evacuation and filled with pure hydrogen each time a tray is charged or removed so that air can be excluded from the system.

Since the chromium metal will be oxidized if the moisture content of the hydrogen exceeds $2.7(10)^{-7}$ atmosphere at 800° C., unusual measures for purifying the hydrogen are necessary. Maier specifies that commercial hydrogen be passed through a drier containing flake KOH, then through a nickel catalyst heated to 600° C., then through a second drier to a tank where it is stored over concentrated sulfuric acid.

From storage, hydrogen enters a closed system that includes a pair of "sorbtion" towers containing active carbon, and operated alternately at room temperature to remove HCl from the circulated hydrogen. When the HCl accumulates to 4% or 5% of the weight of the carbon, the alternate absorber is connected to the circulating system and the HCl is desorbed by heating to 300° C. and flushing with hydrogen. Gas from the absorbers is pumped to the reduction furnace through a final purification absorber cooled to —70° to —140° C. with carbon dioxide snow. This last absorber removes only the last traces of impurities and it requires regeneration infrequently.

A few computations will reveal serious economic and engineering problems in Maier's process. For example, one ton of low-grade chromite yields 1671 pounds of $CrCl_3$ containing 546 pounds Cr and 1125 pounds $Cl_2$. Reduction at 800° C. requires the use of 244,000 cubic feet of hydrogen from which 11,400 cubic feet (1156 pounds) of HCl must be separated. Unless there is a profitable market or use for the HCl, it must be treated to regenerate chlorine and hydrogen.

Thermal requirements of the Maier process are estimated to be about 1.6 million B. t. u. for the heat of reaction (negative) heat lost by radiation and conduction and to heat $CrCl_3$ to reaction temperature, plus 8 million B. t. u. to heat 244,000 cubic feet of hydrogen from the temperature of the last absorber (—100° C.) to reaction temperature (800° C.). A considerable portion of the heat in the hydrogen can be recovered only by employing large and costly heat exchangers.

Maier's observation that "reduction is slow at temperatures in the liquid range" (i. e., the fusion temperature of $CrCl_2$ is 815° C.) may apply to experimental conditions he employed where the reacting surface was very much less after fusion than before. Reaction rate is a function of the surface exposed to the hydrogen; a liquid surface can be extended indefinitely as a film covering a relatively large mass of solid inert "carrier" particles and thus take advantage of the more favorable equilibria and specific reaction rates that can be attained at higher temperature.

Maier also reports that "above 850° C. the material vaporizes faster than it reduces." He does not clearly indicate whether it was $CrCl_3$ or $CrCl_2$ that caused difficulties. Here again the rates are a function of surface and specific rates increase with temperature. More important is the fact that neither $CrCl_2$ or $CrCl_3$ can exist as a vapor in a hydrogen atmosphere unless the latter contains also an equilibrium concentration of HCl.

THE HYDROGEN AND CHROMOUS CHLORIDE FLOW RATES

If an upward flow of hydrogen is passed through a downward moving bed of "carrier" granules coated with molten $CrCl_2$ heated to 1,000° C. and if an equilibrium concentration of HCl (11.9%) is produced by the reaction $CrCl_2 + H_2 = Cr + 2HCl$ before the hydrogen leaves the bed of $CrCl_2$, then the latter will vaporize. However, if in a continuous counter-current process the $CrCl_2$ and hydrogen are supplied at such rates that complete reduction of $CrCl_2$ consumes less than 6.34% of the hydrogen, then the equilibrium concentration of HCl (11.9%) will not be attained and $CrCl_2$ cannot exist as a vapor.

USE OF CARRIER GRANULES IN REDUCTION

To avoid the difficulties experienced by Maier, the liquid chromous chloride is extended as a surface film on inert carrier particles such as granules of pure chromium metal. Satisfactory reduction can be achieved if each pound of $CrCl_2$ is dispersed on the surface of from ten to thirty pounds of chromium granules sized to about minus 1/4 inch. Metal obtained by reduction of $CrCl_2$ is deposited on the surface of the carrier granules; as these build up in size, the largest are removed by a screen and are replaced by smaller granules. If some metal or material other than chromium metal is used as a carrier, the latter will be coated or plated with chromium metal during its passage through the reactor; this is a simple method for chrome-plating various articles.

THE REDUCTION REACTOR

The reactor is preferably a vertical shaft, completely filled with the carrier which is discharged at the bottom, elevated and fed in at the top of the shaft at the preferred rate of twenty pounds per pound of $CrCl_2$. As the latter is discharged from the chlorinator, it is fed directly into the reduction shaft through a gooseneck filled with fused $CrCl_2$, which serves as a gas seal between the two systems. This method completely avoids contamination of $CrCl_2$ that occurs when this exceedingly hygroscopic salt is exposed to air.

HYDROGEN PURIFICATION

The heat required to raise the temperature of the reactants to supply endothermic heat of reaction, and to compensate unavoidable heat losses, can be supplied directly through the wall of the reactor, but I prefer to preheat the large circulating carrier mass. Heat may be supplied to the hydrogen after it has been purified, but I prefer to use only a heat exchanger to raise the temperature as near as possible to that of the $HCl$-$H_2$ mixture when it leaves the reactor.

While one can use the closed gas purification and circulating system described by Maier, I prefer to use a heated bed of finely divided metal such as Cr, Zr, or Ti to remove the last traces of impurities from the hydrogen. This is as effective as a carbon absorber cooled to $-70°$ C. and it reduces the amount of heat that must be removed from the hydrogen before the HCl is separated.

Reduction of $CrCl_3$ yields 2.1 pounds of HCl per pound of chromium metal, in contrast to 1.4 pounds when $CrCl_2$ is treated. This 3 to 2 ratio applies also to the amounts of chlorine and hydrogen consumed in the preparation and reduction of the chlorides.

Increasing the reduction temperature from 800° to 1,000° C. decreases the minimum quantity of hydrogen that must be circulated from 447 to 118 cubic feet per pound of chromium. Approximately the same ratio (3.8 to 1) applies to the size and cost of gas purification and heat exchange equipment and to the unavoidable loss of heat in the gas treatment system.

When these improvements in the reduction step are combined with the more important advantages obtained when the exothermic production of $CrCl_2$ is substituted for the endothermic chlorination of chromite that consumes four times as much chlorine and yields an impure $CrCl_3$ at relatively high temperature, the overall saving in the costs of equipment and operation are substantial.

Another object of the present invention is to provide a process for the manufacture of chromous chloride from chromium oxide.

The accompanying drawing diagrammatically illustrates a suitable apparatus for conducting the process in accordance with the present invention.

Referring to the drawing, I have indicated a chlorination reactor 1, having five hearths $a$, $b$, $c$, $d$, and $e$, on which a finely divided mixture of chromic oxide and chromous chloride, fed into the reactor 1 through the port 2, is kept in a fluidized state by an upward flow of carbon monoxide and chlorine through the porous hearths while the solids travel downward from hearth to hearth through the overflow conduits 3 and finally discharge from the reactor through the outlet 4.

A large portion of the chromous chloride which issues from the outlet port 4 as a granular solid, is mixed with make-up chromic oxide and is then fed through line 27 to the port 2. The gaseous reaction product leaving the top of the reactor, chiefly carbon dioxide with minor amounts of carbon monoxide, is passed through line 24 into cyclone 26 to separate solids which are returned through line 28 to line 27 and thence to the inlet 2. About half of the gas taken off the cyclone through line 30 is discarded and the remainder is passed through a heated bed of carbon in reactor 6 to regenerate carbon monoxide which is returned below hearth $e$ in reactor 1 through line 31 to the port 7 by the pressure blower 8. Chlorine is supplied to the reactor 1 through the port 9, just below hearth $c$.

Chlorine is supplied at a slightly higher rate than is required to convert the chromic oxide to chromous chloride in order to ensure complete chlorination of the oxide. The excess chlorine converts some $CrCl_2$ to $CrCl_3$, but the rates are so regulated that the $CrCl_3$ is only five to ten percent of the $CrCl_2$ in the mixture passing downwardly below hearth $d$.

The discharge port 4 of the reactor 1 is connected to the reduction furnace by a gas tight conduit 11 so that the chromous chloride flows by gravity from one unit to the other without coming in contact with air, thus eliminating oxygen contamination at this point. Conduit 11 leads to a gooseneck 23 in the heated extension of the reduction furnace where the granular chromic and chromous chlorides fuse and provide a gas seal in the passage between the two units.

The reduction furnace 10 is a shaft filled with granules of chromium metal which are introduced through the preheater 12 and are discharged onto a screen 13 which diverts oversize granules to a lock chamber 14. Those granules that pass through the screen are returned to the preheater by an elevator 15. Oversize granules removed from the system are replaced by smaller granules introduced through the hopper and lock chamber 16. This whole system, including the preheater, reduction furnace screen and elevator must be gas tight to exclude air and avoid loss of hydrogen.

Fused chromium chloride flows through the gooseneck onto the top of the descending mass of preheated granules and is dispersed as a film on the large surface where it is reduced to chromium metal by an upward flow of pure hydrogen. The latter enters at a port 17 and, with the hydrogen chloride formed by the reduction reaction, leaves the furnace through 18 which leads to the hydrogen purification system 19. Hydrogen chloride is removed from the latter at 20 and an equivalent amount of hydrogen is supplied at 21 to replace that consumed by the reaction. Hydrogen is circulated through the system by a pressure blower 22.

Thermal insulation for all heated zones, heat exchangers for recirculated CO and $H_2$, and other details which will be obvious to those skilled in the art, have been omitted from the drawing since they form no essential part of this invention.

In practice, a technical grade of chromic oxide in powder form, having a weight of 61 pounds per cubic foot in bulk, is mixed with about twice its weight of $CrCl_2$. This mixture is fed to the reactor 1 at a rate of 200 pounds of $Cr_2O_3$ and 400 pounds of $CrCl_2$ per hour. Carbon monoxide is supplied at a rate of 1600 cubic feet per hour and chlorine at a rate of 1030 cubic feet per hour. (All gas volumes are computed to standard conditions.)

Temperatures in the reaction zones will vary from 720° to 790° C., being generally highest in the central zones. The exit gas, containing approximately 7% of CO and 93% of $CO_2$, is vented at slightly above atmospheric pressure at a rate of 770 cubic feet per hour and about 830 cubic feet per hour are converted to 1600 cubic feet of CO in reactor 6 and recycled.

Chromous chloride containing about 6% chromic chloride is fed from reactor 1 to reactor 10 at a rate of approximately 330 pounds per hour. Hydrogen is circulated through reactor 10 at a rate of 18,000 cubic feet per hour and hydrogen chloride is recovered from the purifier 19 at a rate of 200 pounds per hour. Hydrogen supplied to replace the portion converted to hydrogen chloride and other gas loss from the system will amount to 1160 cubic feet per hour.

Reactor 10 is filled with a 12,000 pound charge of chromium granules which are circulated at a rate of 6,000 pounds per hour and are preheated from the discharge temperature of 840° to a feed temperature of 1060° C. A portion of the oversize granules are removed at intervals from the discharge lock chamber and are broken to pass a ⅛" screen and returned to the system through the lock chamber 16. Over long periods of time, the production of chromium metal is substantially equivalent to the amount of chromic oxide fed to the chlorination unit, or in this instance, 135 pounds of metal per hour.

The quality of the product depends chiefly on the exclusion of oxygen (either free or combined in moisture or other oxides) from the reduction unit. When impurities in the hydrogen are effectively removed by passing through a heated bed of sponge titanium or zirconium, the oxygen content of the chromium product will be so low that the metal is ductile and can be forged, rolled and drawn at elevated temperature. This metal is superior to the brittle chromium made by electrolysis and beyond comparison with the usual chromium metal of commerce that is made by alumina thermic reduction of the oxide.

It will be obvious to those skilled in the art that many different modifications and variations are possible in the practice of this invention without departing from the principle thereof. For example, if one feeds the chromous chloride as a granular solid from the reactor 1 wherein it is formed, through a gas lock to the reduction tower 10 and operates at a temperature below 800° C., omitting the use of the carrier, then one will obtain sponge chromium.

I claim:

1. In a process of producing chromium metal, the steps of dispersing fused chromous chloride on solid carrier particles to coat a thin film of chromous chloride on the carrier particles, and passing the coated carrier particles counter-current to a stream of hydrogen at 850°–1100° C. to reduce the chromous chloride to a chromium coating on the surface of the carrier particles.

2. In a process of producing chromium metal, the steps of dispersing one part by weight of fused chromous chloride on about twenty parts by weight of solid carrier particles to coat a thin film of chromous chloride on the carrier particles, and passing the coated carrier particles counter-current to a stream of hydrogen at 850°–1100° C. to reduce the chromous chloride to a chromium coating on the surface of the carrier particles.

3. In a process of producing chromium metal, the steps of dispersing one part by weight of fused chromous chloride on about twenty parts by weight of solid carrier particles to coat a thin film of chromous chloride on the carrier particles, and passing the coated carrier particles counter-current to a stream of hydrogen, the particles being preheated prior to coating to a temperature of at least 850° C. to reduce the chromous chloride to a chromium deposit on the surface of the carrier particles.

4. In a process of producing chromium metal, the steps of dispersing one part by weight of fused chromous chloride on about twenty parts by weight of solid carrier particles to coat a thin film of chromous chloride on the carrier particles, and passing the coated carrier particles counter-current to a stream of hydrogen, the particles being preheated prior to coating to a temperature of 850°–1100° C., the flow rates being such that the hydrogen chloride content of the hydrogen removed from the reduction is less than the equilibrium concentration to reduce the chromous chloride to a chromium deposit on the surface of the carrier particles.

5. In a process of producing chromium metal, the steps of dispersing one part by weight of fused chromous chloride on about twenty parts by weight of solid carrier particles to coat a thin film of liquid chromous chloride on the carrier particles, passing the coated carrier particles counter-current to a stream of hydrogen at a temperature of 850°–1100° C. to reduce the chromous chloride thereon to chromium, removing chromium coated particles from said zone, preheating at least a portion of said particles to a temperature of 850°–1100° C., and returning the preheated carrier particles for coating with added chromous chloride.

6. A process for producing chromous chloride in a multiple hearth reactor comprising maintaining the reactor at a temperature of 600°–800° C., introducing substantially pure chromic oxide onto an upper hearth in the reactor for downward movement through the reactor, introducing carbon monoxide onto a lower hearth of the reactor for upward movement through the reactor and to provide a reducing atmosphere on said lower hearth wherein residual chromic chloride and chromic oxide are converted to granular chromous chloride, and introducing chlorine onto an intermediate hearth in the reactor for upward movement through the reactor and to provide with the carbon monoxide a reducing chlorinating atmosphere on the intermediate and upper hearths to convert chromic oxide to granular chromic chloride and granular chromous chloride sufficient chlorine being introduced to ensure complete chlorination and conversion of the chromic oxide to a preponderance of chromous chloride.

7. In a process for producing metallic chromium from chromic oxide in a multiple hearth reactor and a reduction furnace, maintaining the reactor at a temperature of 600–800° C., introducing substantially pure chromic oxide onto an upper hearth in the reactor for downward movement through the reactor, introducing carbon monoxide onto the lower hearth of the reactor for upward movement through the reactor, and to provide a reducing atmosphere on said lower hearth wherein residual chromic chloride and chromic oxide are converted to granular chromous chloride, introducing chlorine into an intermediate hearth in the reactor for upward movement through the reactor and to provide with the carbon monoxide a reducing chlorinating atmosphere on the intermediate and upper hearths to convert chromic oxide to granular chromic chloride and granular chromous chloride, sufficient chlorine being introduced to ensure complete chlorination and conversion of the chromic oxide to a preponderance of chromous chloride, removing the granular chromic chloride and granular chromous chloride as such directly from the reactor at a temperature of 600–800° C., fusing the granular chromic chloride and chromous chloride, and maintaining a liquid body of fused chromic chloride and chromous chloride to exclude air and moisture from contact with the granules as they are being withdrawn from the reactor, feeding the fused liquid chromic chloride and chromous chloride into the reduction furnace, and reducing the liquid chromous chloride to chromium within the reduction furnace with hydrogen at 850–1100° C.

8. In a process for producing metallic chromium from chromic oxide, maintaining a reaction zone at a temperature of 600–800° C., introducing substantially pure chromic oxide in the upper end of said reaction zone for downward movement through the reaction zone, introducing carbon monoxide into the lower end of said reaction zone for upward movement through the reaction zone and to provide a reducing atmosphere in the lower end of said reaction zone wherein residual chromic chloride and chromic oxide are converted to granular chromous chloride, introducing chlorine into an intermediate portion of said reaction zone for upward movement through the reaction zone and to provide with the carbon monoxide a reducing chlorinating atmosphere in the intermediate and upper end portion of the reaction zone to convert chromic oxide to granular chromic chloride and granular chromous chloride, sufficient chlorine being introduced to ensure complete chlorination and conversion of the chromic oxide to a preponderance of chromous chloride, removing the granular chromic chloride and granular chromous chloride as such directly from the reaction zone at a temperature of 600–800° C. while excluding air and moisture from contact with the granules, fusing the heated granules to provide a liquid, feeding the liquid into a second reaction zone, and reducing the liquid to chromium in the second reaction zone with hydrogen at 850–1100° C.

9. In a process for producing metallic chromium from chromic oxide, maintaining a reaction zone at a temperature of 600–800° C., introducing substantially pure chromic oxide in the upper end of said reaction zone for downward movement through the reaction zone, introducing carbon monoxide into the lower end of said reaction zone for upward movement through the reaction zone and to provide a reducing atmosphere in the lower end of said reaction zone wherein residual chromic chloride and chromic oxide are converted to granular chromous chloride, and introducing chlorine into an intermediate portion of said reaction zone for upward movement through the reaction zone and to provide with the carbon monoxide a reducing chlorinating atmosphere in the intermediate and upper end portion of the reaction zone to convert chromic oxide to granular chromic chloride and granular chromous chloride, sufficient chlorine being introduced to ensure complete chlorination and conversion of the chromic oxide to a preponderance of chromous chloride.

References Cited in the file of this patent

UNITED STATES PATENTS

| | | |
|---|---|---|
| 1,373,038 | Weber | Mar. 29, 1921 |
| 1,497,417 | Weber | June 10, 1924 |
| 1,814,392 | Low et al. | July 14, 1931 |
| 2,020,431 | Osborne et al. | Nov. 12, 1935 |
| 2,133,998 | Maier | Oct. 25, 1938 |
| 2,142,694 | Maier | Jan. 3, 1939 |
| 2,246,386 | Schneider | June 17, 1941 |
| 2,277,220 | Gailey | Mar. 24, 1942 |
| 2,341,844 | Maier | Feb. 15, 1944 |
| 2,349,747 | Muskat | May 23, 1944 |
| 2,378,675 | Agnew et al. | June 19, 1945 |
| 2,607,674 | Winter | Aug. 19, 1952 |
| 2,657,976 | Rowe et al. | Nov. 3, 1953 |
| 2,670,270 | Jordan | Feb. 23, 1954 |

FOREIGN PATENTS

| | | |
|---|---|---|
| 827,315 | France | Jan. 24, 1938 |
| 336,184 | Italy | Feb. 13, 1936 |

OTHER REFERENCES

Journal of Metals, April 1950, pages 634–640.

Elements of Chemical Engineering by Bodger & McCabe, 2nd ed., published 1936 by McGraw-Hill Book Co., Inc., New York. Pages 376–379.